(12) United States Patent
Luevano

(10) Patent No.: US 6,725,999 B2
(45) Date of Patent: *Apr. 27, 2004

(54) UNLOADING APPARATUS

(75) Inventor: Ruben Luevano, Fontana, CA (US)

(73) Assignee: Sears Brands, LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/350,656

(22) Filed: Jan. 24, 2003

(65) Prior Publication Data

US 2003/0111322 A1 Jun. 19, 2003

Related U.S. Application Data

(63) Continuation of application No. 09/894,157, filed on Jun. 27, 2001.

(51) Int. Cl.⁷ .............................................. B65G 47/10
(52) U.S. Cl. ................. 198/361; 198/369.1; 198/369.6; 414/373; 414/390; 414/397
(58) Field of Search ................................ 198/360, 361, 198/435, 448, 369.1, 369.6; 414/373, 390, 397

(56) References Cited

U.S. PATENT DOCUMENTS

| | | |
|---|---|---|
| 1,502,093 A | 7/1924 | Faircloth et al. |
| 1,655,686 A | 1/1928 | Artas |
| 1,784,273 A * 12/1930 | Constable ................... 198/448 |
| 1,809,200 A | 6/1931 | Guille |
| 2,613,788 A | 10/1952 | McLaughlin |
| 2,627,960 A | 2/1953 | Eberle |
| 2,707,585 A | 5/1955 | Hoey |
| 2,760,617 A | 8/1956 | Bowen |
| 3,220,527 A | 11/1965 | Curtis |
| 3,244,300 A | 4/1966 | Erdody |
| 3,688,926 A | 9/1972 | Stefanelli |
| 3,807,584 A | 4/1974 | Herr |
| 3,896,944 A | 7/1975 | Idoffsson |
| 4,221,519 A | 9/1980 | Nord et al. |
| 4,878,800 A | 11/1989 | Dell |
| 5,037,265 A | 8/1991 | O'Brien |
| 5,325,953 A | 7/1994 | Doster et al. |
| 5,361,889 A * 11/1994 | Howell et al. ............... 198/360 |
| 6,543,601 B2 * 4/2003 | Luevano ..................... 198/361 |

* cited by examiner

Primary Examiner—Joseph E. Valenza
(74) Attorney, Agent, or Firm—Michael Best & Friedrich LLP

(57) ABSTRACT

A mobile unloading apparatus for unloading items from a variety of heights is disclosed wherein the apparatus has a frame supporting a ramp for movement between a first position spaced above a conveyor for permitting items to be placed directly on the conveyor and a second, downwardly sloping ramp position for moving items down the ramp to the conveyor. The apparatus includes a first walkway section supported by the frame on a first conveyor side above a supporting surface, a second walkway section supported by the frame on a second conveyor side above the supporting surface and a third walkway section. The third walkway section can be moved from a first, use position bridging the first and second walkway sections to a second, storage position.

15 Claims, 6 Drawing Sheets

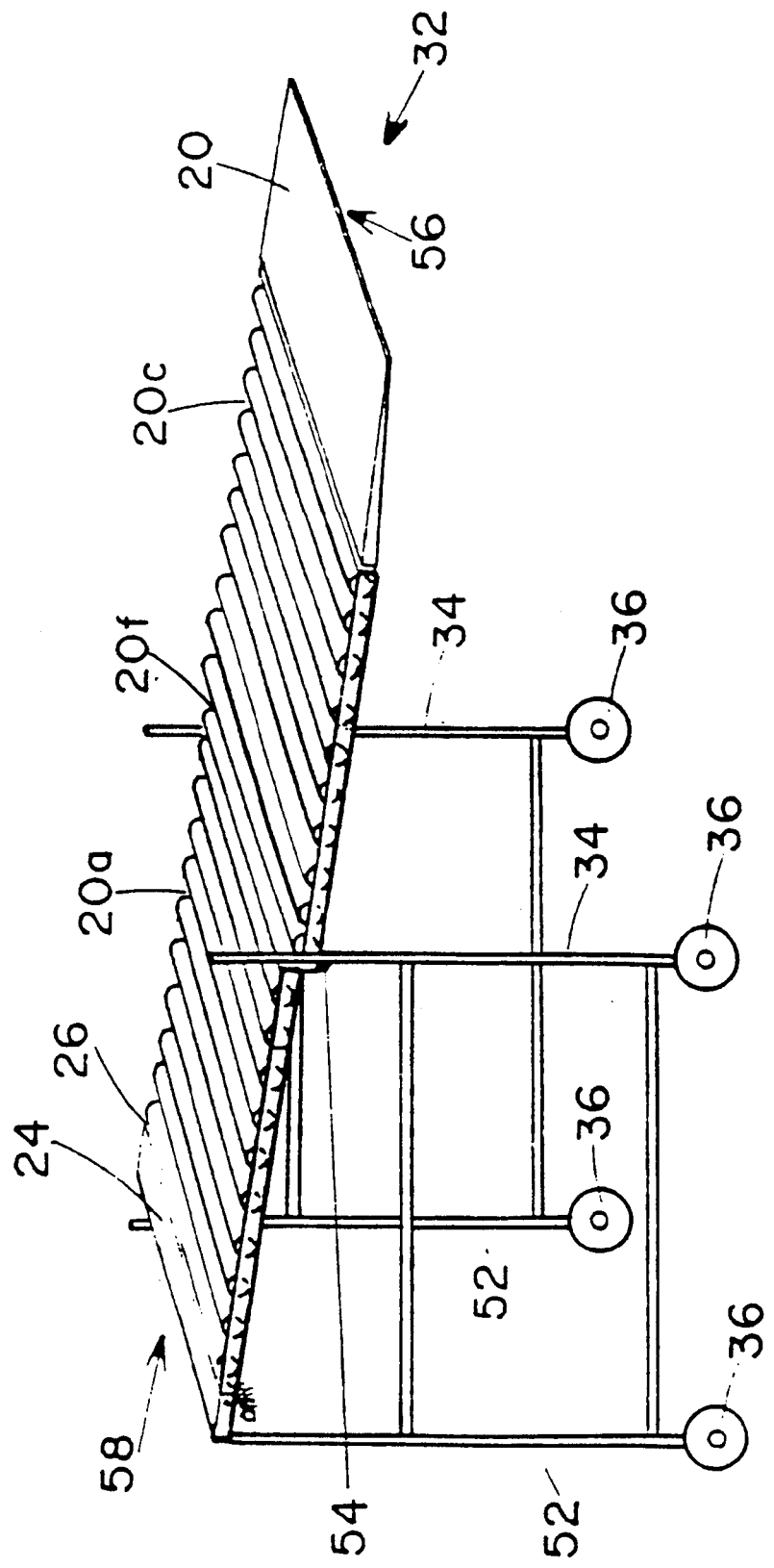

UNLOADING APPARATUS

CROSS-REFERENCE TO RELATED APPLICATIONS

This application is a continuation of application Ser. No. 09/894,157 which was filed Jun. 27, 2001.

FIELD OF THE INVENTION

The invention relates generally to an apparatus for unloading objects and, more specifically, to an apparatus to assist in unloading bulky objects onto conveyors.

BACKGROUND OF THE INVENTION

The movement of goods efficiently through commerce is of great importance to the modem economy of today. More and more manufacturers attempt to save costs by maintaining a minimal inventory of parts, relying on the just in time delivery of parts to maintain production and of goods to restock the shelves in stores, thereby limiting the expense of maintaining a large inventory of parts and goods. As a result, rapid and efficient loading and unloading of vehicles has become more and more important in the modem economy.

Current methods and apparatus for unloading vehicles are not as efficient as possible. For example, mobile conveyors exist that can be rolled into vehicles which facilitate moving boxes outside the vehicle. Some conveyors are even powered, thereby assisting the removal of items from the vehicles. However, items still must be manually loaded onto the conveyor and the conveyor is maintained at a single height. Accordingly, unloading boxes from the upper reaches of a vehicle can require a great amount of physical effort and time to safely remove the object from the upper reaches of the vehicle and safely bring the object down to the height of the conveyor. Such stretching and reaching often causes injuries to the people unloading the vehicle. Further, large and bulky items often are damaged when they are unloaded from the upper reaches of the vehicle. Setting the height of the conveyor at a higher level develops its own problems, making those unloading a vehicle lift the large and bulky boxes up and onto the elevated conveyor which puts great physical stress on the unloaders and significantly increases the probability of a box being dropped thereby damaging the goods in the box.

SUMMARY OF THE INVENTION

A mobile unloading apparatus for unloading items from a variety of heights is disclosed. The apparatus has a ramp movable between a first ramp position and a second ramp position. The ramp is centered over a central opening and a conveyor. The apparatus has a first walkway section on a first conveyor side above a supporting surface, a second walkway section on a second conveyor side above the supporting surface and a third walkway section above the supporting surface wherein the third walkway section can be moved from a first walkway position to a second walkway position. Optionally, the third walkway section is made up of a first pivoting platform section and a second pivoting platform section. In some embodiments, the first walkway section and second walkway section are on opposite sides of the conveyor.

In accordance with another aspect of the invention, the ramp is connected to a transfer platform by a pivot. In another aspect of the invention, the first ramp position has the loading end of the ramp and the unloading end of the ramp raised by a spring above the conveyor such that items can flow on the conveyor beneath the ramp.

In accordance with yet another aspect of the invention, the second ramp position has a loading ramp end positioned above an unloading ramp end and the unloading ramp end positioned in close proximity to the conveyor allowing items to flow down the ramp from the loading ramp end to the unloading ramp end onto the conveyor. The ramp may rest on a support when the ramp is in the second position.

In accordance with another aspect of the invention, the first walkway position has the third walkway section suspended virtually horizontal and parallel to the conveyor in close proximity to the first and second walkway sections allowing a user to travel continuously on the first, second and third walkway. In addition, the second walkway position may have the third walkway section virtually vertical creating the central opening allowing the conveyor to project through and beyond the apparatus. Optionally, the ramp may be at least twenty-four inches above the conveyor when the ramp is in the first ramp position.

In accordance with yet another aspect of the invention, items can be passed through the apparatus on the conveyor when the ramp is in the first ramp position and the third walkway section is in the second position. Other features and advantages are inherent in the apparatus claimed and disclosed or will become apparent to those skilled in the art from the following detailed description and its accompanying drawings.

BRIEF DESCRIPTION OF THE DRAWINGS

FIGS. 4a–4c are illustrations of one embodiment of a ramp attached to the mobile bulk unloading apparatus in accordance with the claims of the invention.

DESCRIPTION OF THE PREFERRED EMBODIMENTS

Figure 1:
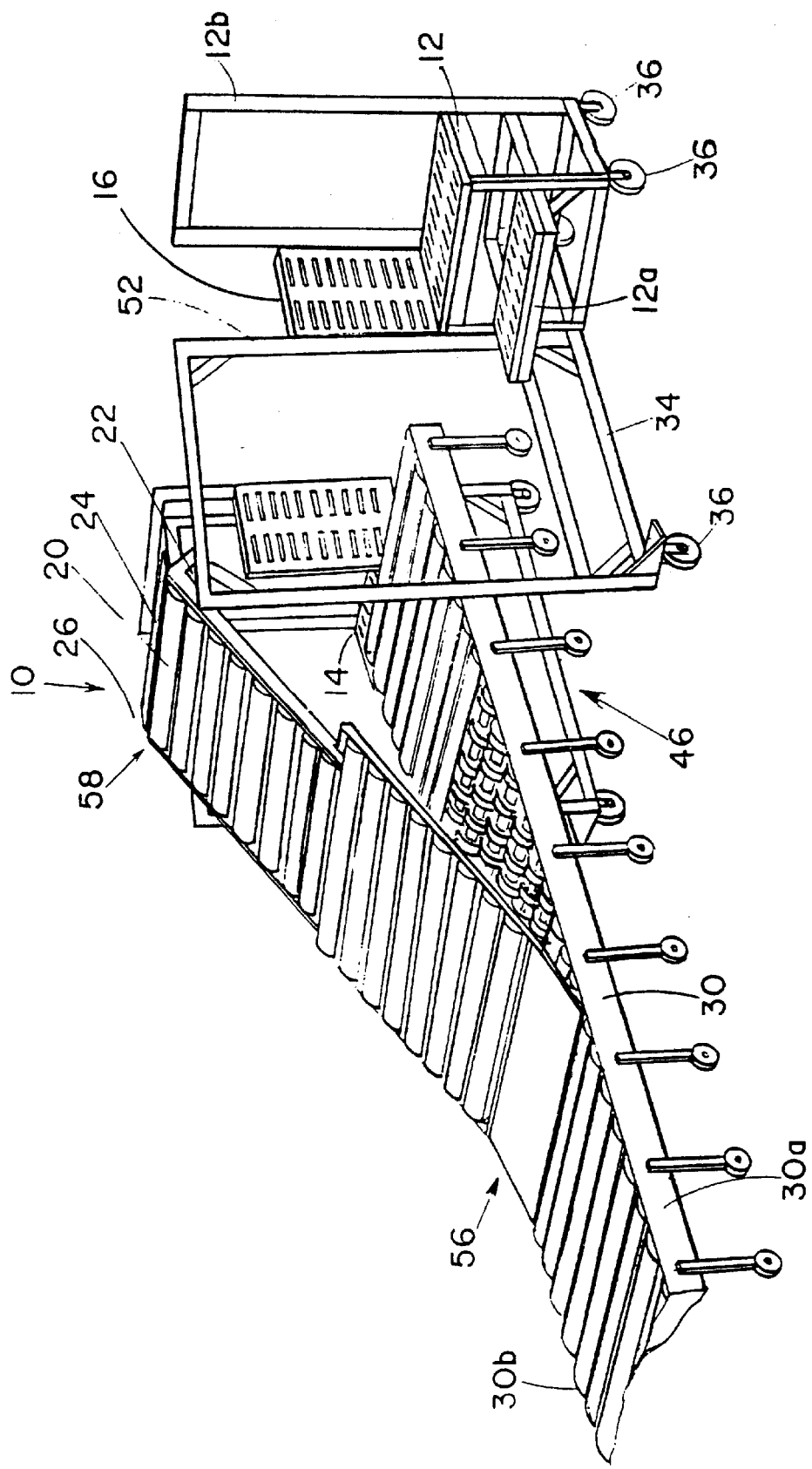
FIG. 1 is an illustration of one embodiment of a mobile bulk unloading apparatus in accordance with the claims of the invention.

Referring first to FIG. 1, one embodiment of an unloading apparatus 10 is illustrated. The apparatus 10 has a first walkway section 12, a second walkway section 14 and a third walkway section 16, all of which are raised above a supporting surface. When the third walkway section 16 is in a first, use position 18 (see FIG. 2a), the first 12, second 14 and third walkway sections 16 are on virtually the same horizontal plane allowing a user to walk around the apparatus 10 using the walkway sections 12, 14, 16 which are all spaced above the supporting surface. The apparatus 10 also has a ramp 20 with a spring 22 that is connected to a loading platform 24 through a hinge or pivot 26. Advantageously, a first position 28 of the ramp 20 allows objects lower in a vehicle to be easily unloaded by placing them directly onto a conveyor 30 (FIG. 4a) and a second position 32 of the ramp 20 (FIG. 4b) allows objects high in a vehicle to be easily unloaded using the apparatus 10.

The unloading apparatus 10 itself is made of a sturdy metal frame 34. In the preferred embodiment, the frame 34 is made of stainless steel welded together at any junction points. However, any other metal can be substituted such as an aluminum alloy or even a resin composite so long as the unloading apparatus 10 continues to be as strong and stable as necessary to handle the loads and wear that come with moving the unloading apparatus 10 in and out of various vehicles and using it to unload heavy, bulky objects. The unloading apparatus 10 is preferably constructed to have a width and height such that it can comfortably fit into most commonly unloaded vehicles such as a tractor trailer, railroad car, ship or other vehicles where moving large, heavy boxes from a variety of heights may be difficult.

In the preferred embodiment, the unloading apparatus 10 has wheels 36 on its four corners which makes the unloading apparatus 10 mobile but sturdy so that users can walk on the walkways 12, 14, 16 of the unloading apparatus 10 without being concerned about instability or tipping. Further, the wheels 36 may preferably have locks which will provide further stability to the unloading apparatus 10 without limiting its mobility and usefulness. In addition, more or less wheels 36 may be used as required by the particular environment in which the unloading apparatus 10 will be used taking into account the heft of the objects to be unloaded.

In the preferred embodiment, the first walkway section 12 is secured to the frame 34 on a first conveyor side 30*a* and the second walkway section 14 is secured to the frame 34 on a second conveyor side 30*b*. The first conveyor side 30*a* is directly opposite and parallel to the second conveyor side 30*b*. Also in the preferred embodiment, the first and second walkway sections 12, 14 preferably have steps such as 12*a*, 14*a* on the end of the walkway sections 12, 14 opposite the third walkway section 16 which assist a user in climbing onto the unloading apparatus 10 and, for safety, the first and second walkway sections 12, 14 may advantageously have safety rails 12*b*, 14*b* on a second side of the walkway sections 12, 14, for example, on the outside edges of the walkway sections 12, 14 parallel to the conveyor 30. The supporting surface upon which the unloading apparatus 10 is positioned could be, by way of example, the floor of a vehicle or a floor in a warehouse.

Figure 2A:
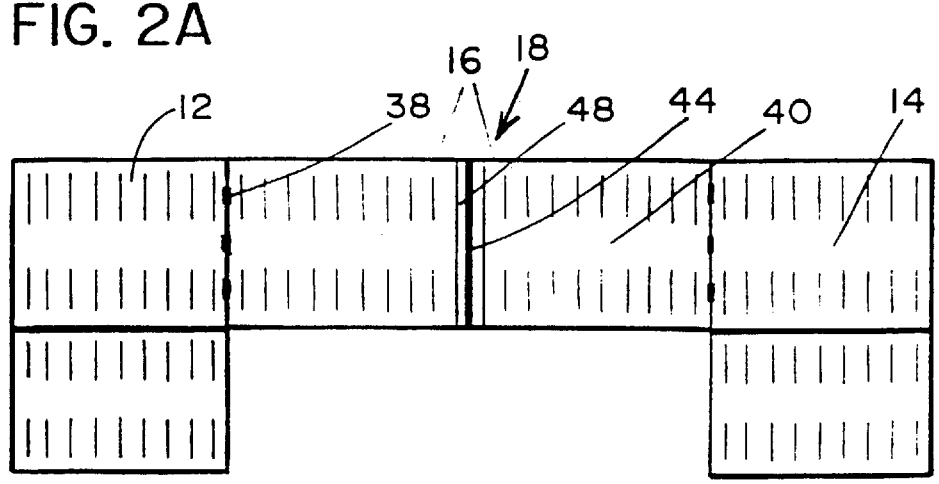
FIGS. 2a–2c are illustrations of one embodiment of walkway sections for the mobile bulk unloading apparatus in accordance with the claims of the invention.
Figure 2B:
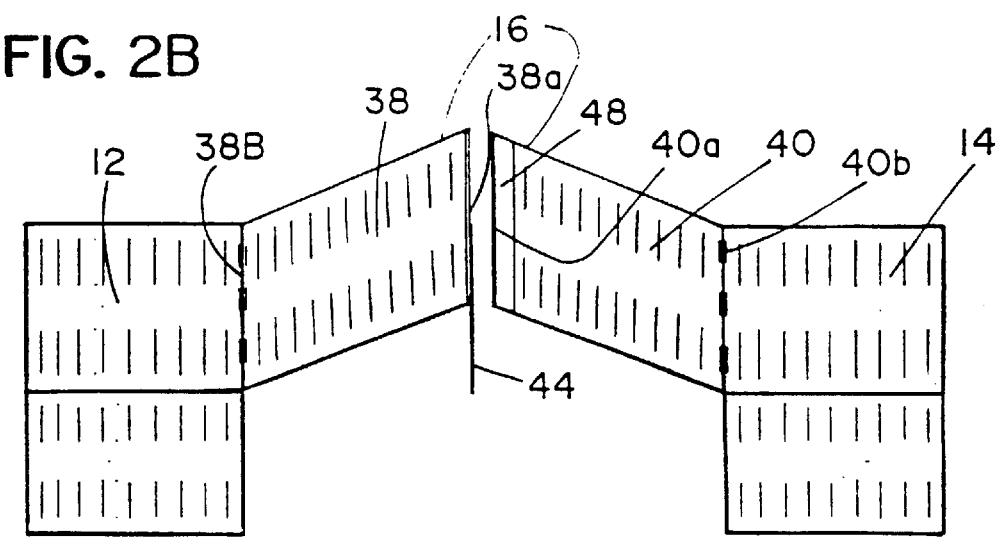
Figure 2C:
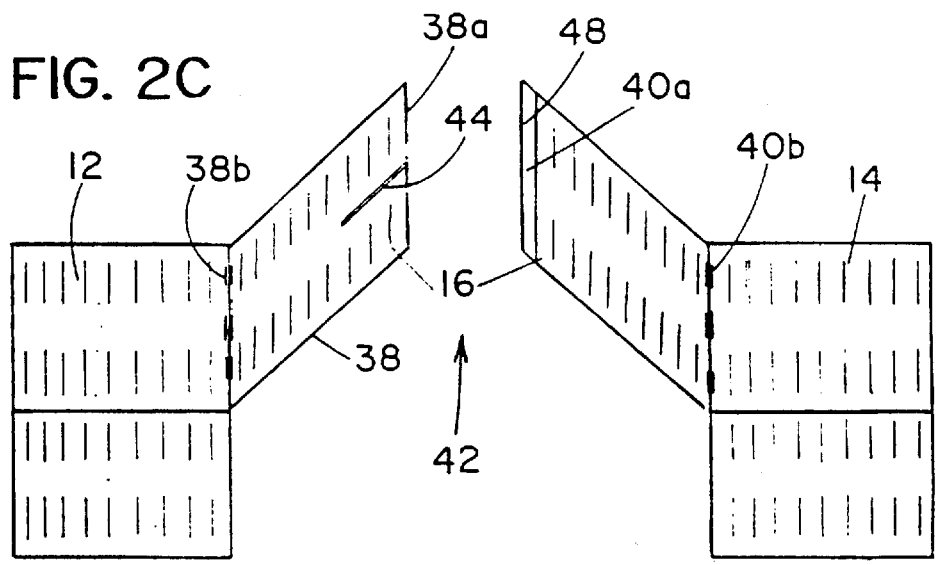

Referring now to FIGS. 2*a*–2*c*, a third walkway section 16 of the unloading apparatus 10 will be described in greater detail. In the preferred embodiment, the third walkway section 16 is made up of a first pivoting platform section 38 and a second pivoting platform section 40 with the first pivoting platform section 38 connected through the use of a hinge to the first walkway section 12 and the second pivoting platform section 40 connected through the use of a hinge to the second walkway section 14.

The third walkway section 16 can be placed in the first, use position 18 and it can also be moved to a second, storage position 42 (compare FIGS. 2*a* and 2*c*). In the preferred embodiment, in the first, use position 18, the first pivoting platform section 38 and second pivoting platform section 40 are virtually horizontal, with the first, second and third walkway sections 12, 14, 16 being on the same virtual plane allowing a user to walk unimpeded around the walkway above the supporting surface. The first pivoting platform section 38 has a support stand 44 attached via a hinge to the end 38*a* opposite the pivoting end 38*b* of the first pivoting platform section 38 that is attached to the first walkway section 12 for pivoting movement between the first, use position 18 and the second, storage position 42. In the second, storage position 42, the first pivoting platform section 38 and second pivoting platform section 40 are virtually vertical creating a central opening 46 (FIG. 2*c*) allowing a worker to step through the unloading apparatus 10 to place items directly onto the conveyor 30 or allowing the unloading apparatus 10 to be placed around the conveyor 30 with the conveyor 30 extending through the central opening 46 and beyond the unloading apparatus 10 so that users can easily unload items stacked lower in a vehicle by placing them on the conveyor 30. While the first pivoting platform section 38 is in the second, storage position 42, the support stand 44 hangs virtually vertical and out of the way of items placed on the conveyor 30 and workers working around the unloading apparatus 10.

As shown in FIG. 2*b*, when the third walkway section 16 is moved from the second, storage position 42 in which both the first and the second pivoting platform sections 38, 40 are virtually vertical to the first, use position 18 in which both the first and second pivoting platform sections 38, 40 are virtually horizontal, the support stand 48 on the first pivoting platform section 38 will be disposed virtually vertical and will touch the surface below the unloading apparatus 10 providing support to the first pivoting platform section 38. As shown in FIG. 2*c*, in addition to support of the first pivoting platform section 38 by the support stand 18, the second pivoting platform section 40 has a threshold 48 in the form of an extending flange on the end 40*a* opposite the pivoting end 40*b* that is attached to the second walkway section 14 for pivoting movement between the first, use position 18 and the second, storage position 42. The threshold 48 will lay across and rest on the first pivoting platform section 38 when the second pivoting platform section 40 is in the first, use position 18 and will provide support to the second pivoting platform section 40 through the support stand 44 that is vertically disposed in contact with the supporting surface. Accordingly, as illustrated in FIGS. 2*a*, 2*b* and 2*c*, in the preferred embodiment, moving the third walkway section 16 from the second, storage position 42 to the first, use position 18 entails moving the first pivoting platform section 38 from a nearly vertical orientation to a horizontal orientation whereby the support stand 44 will remain vertical and come to rest on the supporting surface and moving the second pivoting platform section 40 from a nearly vertical orientation to a horizontal orientation and allowing the threshold 48 to rest on the first pivoting platform section over the support stand 44 thereby creating a single, relatively flat supported third walkway above the supporting surface. Advantageously, because the first pivoting platform section 38 and second pivoting platform section 40 can be pivoted to the second, storage position 42 to create the central opening 46, the conveyor 30 can be moved completely through the unloading apparatus 10 and items can be placed directly on the conveyor 30 at appropriate times without concern of interference by the unloading apparatus 10.

Of course, it will be understood that the support stand 44 could be attached to the second pivoting platform section 40 and the threshold 48 could be attached to the first pivoting platform section 38. Further, it will be appreciated that any of a number of conventional means which are well known by those skilled in the art may be provided to lock the support stand 44 in a vertical position when the third walkway section 16 is in the first, use position 18 and to lock the first and second pivoting platform sections 38 and 40 in a nearly vertical position when the third walkway section is in a second, storage position 42.

Figure 3B:
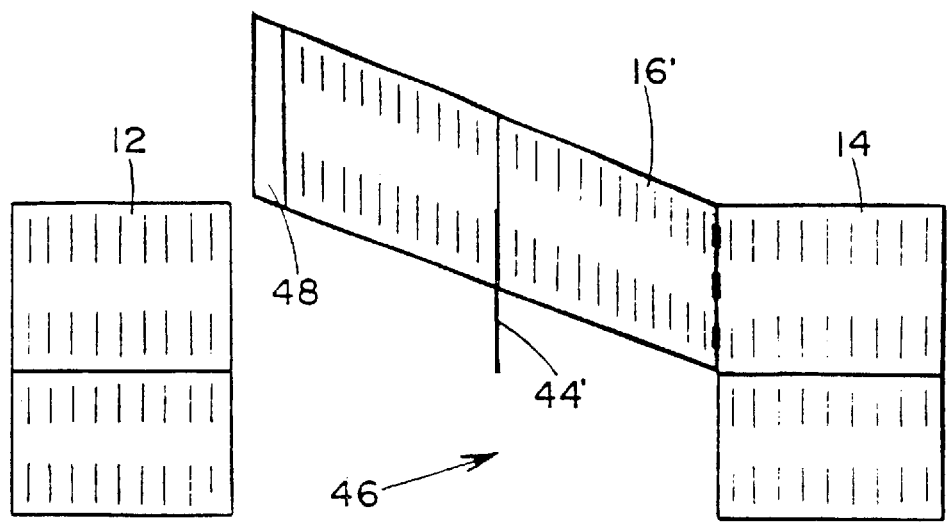
FIGS. 3a–3b are illustrations of another embodiment of the walkway sections for the mobile bulk unloading apparatus in accordance with the claims of the invention.
Figure 3A:
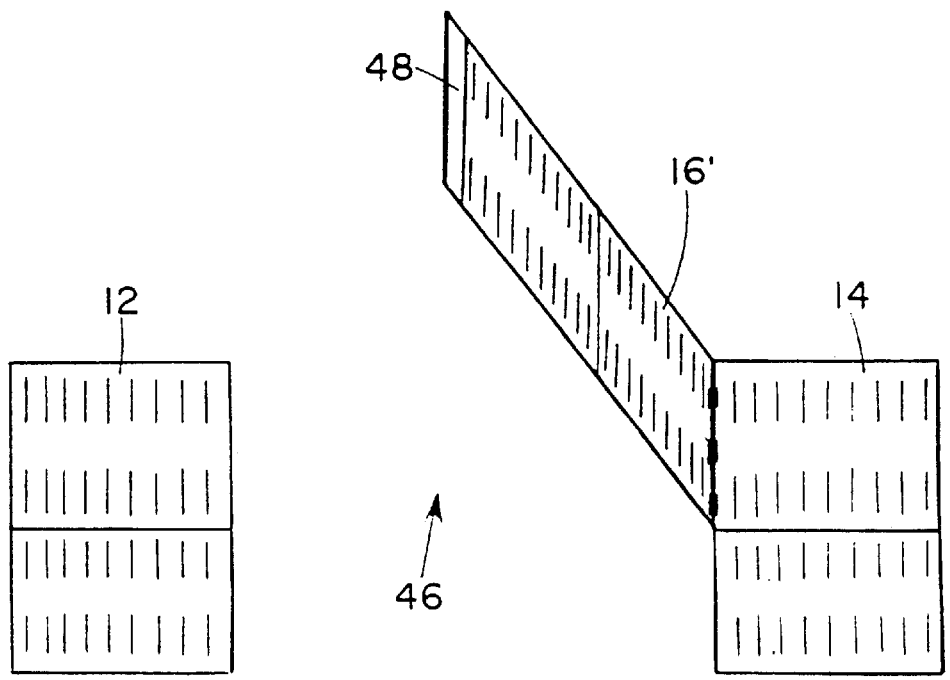

As shown in FIG. 3*a*, in an alternative embodiment, the third walkway section 16\* is a single pivoting platform attached via a hinge to either the first walkway section 12 or to the second walkway section 14. The third walkway section 16\* can then be pivoted on a hinge to a vertical position such that the central opening 46 is created in the unloading apparatus 10 or the third walkway section 16\* can be pivoted to a horizontal position where a threshold 48 in the form of an extending flange or the like rests on the opposite walkway section and creates a continuous walkway around the unloading apparatus 10. As illustrated in FIG. 3b, for added stability, the third walkway section 16 can also have a support stand 44* which can pivot down from an intermediate point along the third walkway section 16* to rest on the support surface to provide support when the third walkway section 16* is moved to the use position.

In the preferred embodiment, the first, second and third walkways 12, 14, 16 are advantageously made from stainless steel with the walkways 12, 14, 16 having ridges cut in the stainless steel to allow better traction. In alternate embodiments, the walkways 12, 14, 16 could be made from steel, aluminum or other alloys or resins. In fact, the only requirement is that the walkways 12, 14, 16 have the strength necessary to uphold a worker and the weight associated with the object to be moved and to withstand the wear and tear associated with moving objects.

Figure 4A:
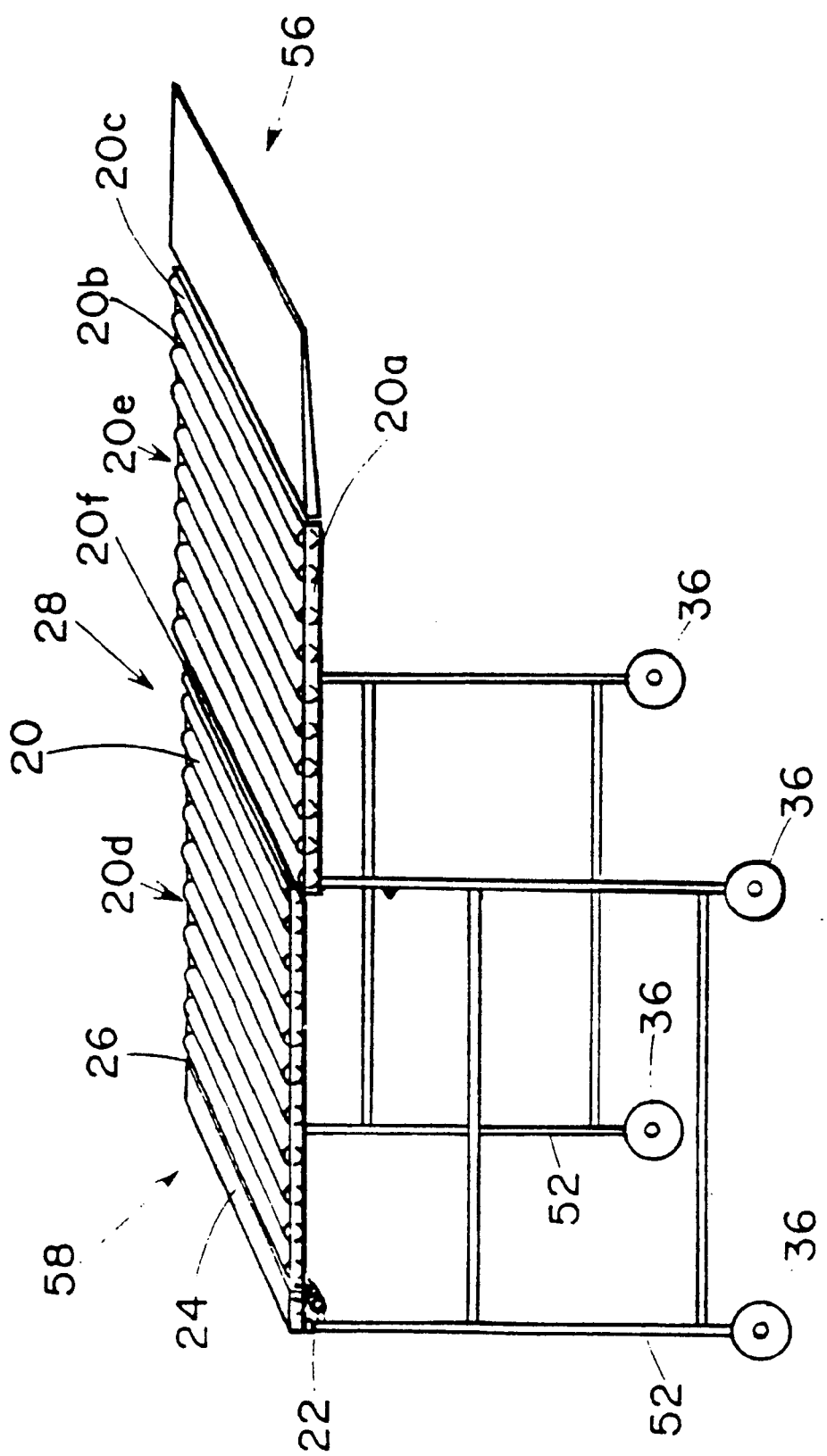
Figure 4C:
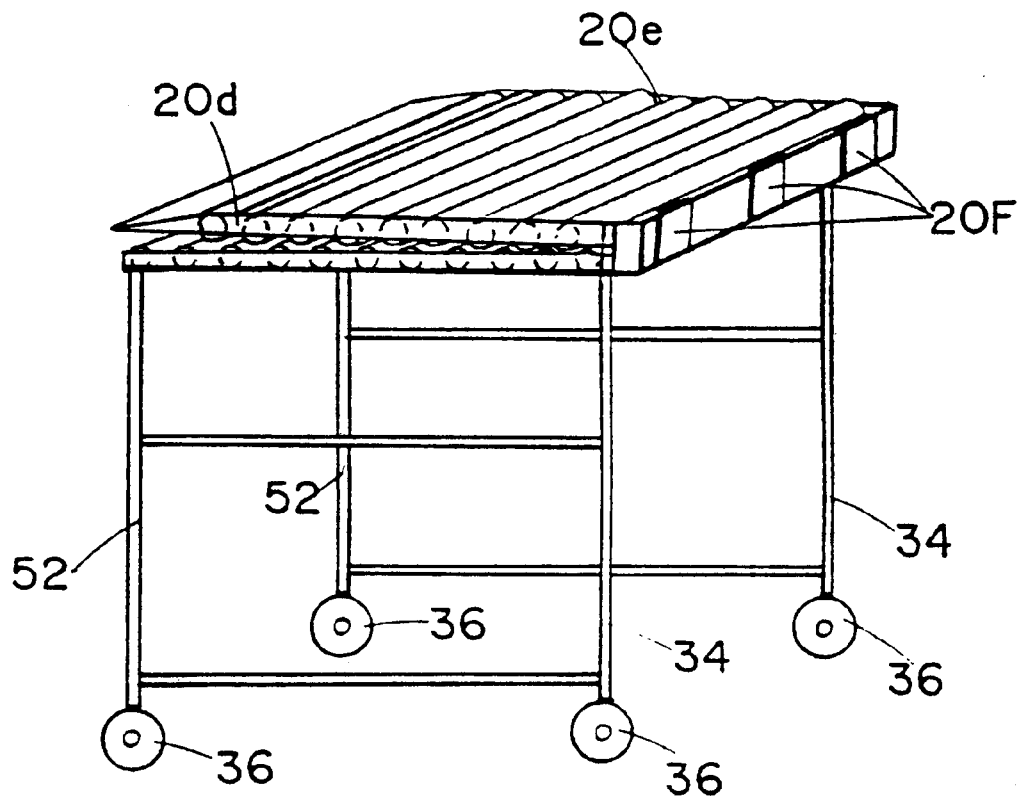

Referring to FIG. 4a, as previously mentioned, the unloading apparatus 10 has the ramp 20 connected by a hinge 26 to the loading platform 24, and the ramp 20 which is attached to the unloading apparatus 10 via pivots at rear support members 52 of the unloading apparatus 10. The ramp 20 is made up of parallel side rails 20a, 20b with a number of rollers 20c connecting the two rails. The rollers 20c are spaced such that items such as boxes which are placed on the ramp 20 will move smoothly down the ramp. In addition, the rollers 20c which are commercially available from numerous industrial supply catalogs are advantageously selected to be sufficiently strong to withstand the weight of the items placed on them and to withstand the repeated wear and tear that is inherent in unloading operations. The transfer platform 24 is virtually horizontal and has rollers leading to the ramp 20. In an alternative embodiment, the ramp 20 may have a first section 20d and a second section 20e connected by a hinge 20f such that the second section 20e may be folded via the hinge 20f on top of the first section 20d such that the ramp 20 will not extend beyond the unloading apparatus 10.

When the ramp 20 is in the second position 32 (FIG. 4b), it rests on supports 54 and an unloading end 56 of the ramp 20 is located in close proximity to the conveyor 30. The ramp 20 in this position has a downward slope, sloping downward from a loading end 58 to the unloading end 56. Advantageously, the slope of the ramp 20 allows items that are stacked high in a vehicle to be loaded onto the transfer platform 24 and conveyed down the ramp 20 onto the conveyor 30 without much lifting and lowering of the item. Further, this unloading is made even easier by having the first, second and third walkway sections 12, 14, 16 be on the same virtual horizontal plane above the supporting surface, allowing unloaders to walk around the apparatus 10 and not be forced to reach excessively to obtain items stored high in a vehicle. Advantageously, an unloader can stand on and walk around the first, second and third walkway sections 12, 14, 16 to easily reach bulky items and the unloaders will only have to carry each item to the transfer platform 24, a small distance, making unloading significantly easier.

The ramp 20 may rest in the first position or raised position 28 where the force of the spring 22 holds the loading end 58 of the ramp 20 at virtually the same height as an unloading end 56 of the ramp 20, such that the ramp 20 is virtually parallel to a conveyor 30 or the like, thereby creating a gap or space under the raised ramp where objects can move along on the conveyor under the ramp 20 (FIG. 4a). When sufficient weight is placed on the ramp 20, the ramp 20 will pivot to the second position 32 or lowered position where the loading end 58 of the ramp 20 may be higher than an unloading end 56 of the ramp 20 with the unloading end 56 resting in close proximity to the conveyor 30 allowing objects to move from a loading platform 24 to the ramp 20 with the loading end 58 higher than the unloading end 56, and onto the conveyor 30 (FIG. 4b). The spring 22 exerts sufficient force to hold the ramp 20 virtually horizontal when no weight is on the ramp, but will allow the ramp 20 to pivot to the second position 32 when a sufficient amount of weight is placed on the ramp 20. In the first position, the ramp 20 is held above the conveyor 30 at a sufficient height to allow items to be unloaded and to move along the conveyor 30 under the ramp 20.

From the foregoing, it will be appreciated that the apparatus 10 allows unloaders to unload items from a variety of heights in a vehicle in a less stressful and more efficient manner. When items high in a vehicle are to be unloaded, the ramp 20 may be in the first ramp position 28 and the third walkway section 16 will be moved to the first, use position 18, allowing an unloader to stand on and walk around the first, second and third walkway sections 12, 14, 16 above the supporting surface and carry each item a short distance from its location within the vehicle to the loading end 58 of the ramp 20, where the item will be placed on the transfer platform 24, will move down the ramp 20, pushing the ramp from the first, raised position 28 to the second or lowered position 32 (FIG. 4b), where the item will move onto the conveyor 30. When items low in a vehicle are to be unloaded, the ramp 20 will be in the first ramp position 32 (FIG. 4a), and the third walkway section 16 will be moved to the second, storage position 42 allowing the conveyor 30 to be moved through the central opening 46 so that items can then be moved from the lower part of the vehicle directly to the conveyor 30 with a small amount of lifting and moving.

Numerous modifications and alternative embodiments of the invention will be apparent to those skilled in the art in view of the foregoing description. Accordingly, this description is to be construed as illustrative only and is not to be limiting of the invention. Thus, the details herein given may be varied substantially without departing from the spirit of the invention. Accordingly, the exclusive use of all modifications which are within the scope of the appended claims is reserved.

What is claimed is:

1. An unloading apparatus for unloading items from a variety of heights onto a separate conveyor, the unloading apparatus comprising:
   a frame; and
   a ramp supported by the frame, the ramp movable between a first position where the ramp is held above the separate conveyor to allow items to be placed directly onto the separate conveyor and travel along the separate conveyor without contacting any portion of the ramp, and a second position where the ramp slopes downwardly to move items down the ramp to the separate conveyor;
   wherein the ramp is biased toward the first position.

2. The unloading apparatus of claim 1, wherein the ramp is biased toward the first position by a spring.

3. The unloading apparatus of claim 1, wherein the ramp has a loading ramp end and an unloading ramp end such that when the ramp is in the second position, the loading ramp end is positioned above the unloading ramp end with the unloading ramp end positioned adjacent to the separate conveyor allowing items to move from the loading ramp end to the unloading ramp end onto the separate conveyor.

4. The unloading apparatus of claim 3, wherein both the loading ramp end and the unloading ramp end are spaced above the separate conveyor when the ramp is in the first position to permit items to be placed directly on the separate conveyor beneath the ramp.

5. The unloading apparatus of claim 3, further comprising a loading platform coupled to the loading ramp end for relative movement with respect to one another.

6. The unloading apparatus of claim 5, wherein the loading platform is coupled to the loading ramp end by a hinge.

7. The unloading apparatus of claim 1, wherein the ramp further comprises a first section coupled to a second section, the first and second sections coupled together for relative movement with respect to one another.

8. The unloading apparatus of claim 1, wherein the ramp is positioned over an opening in the unloading apparatus and is further positioned over the separate conveyor.

9. The unloading apparatus of claim 1, further comprising:
- a first walkway section supported by the frame on a first conveyor side;
- a second walkway section supported by the frame on a second conveyor side; and
- a third walkway section movable between a first, use position and a second, storage position.

10. The unloading apparatus of claim 9, wherein the first, use position of the third walkway section forms a bridge between the first and second walkway sections, and wherein the second, storage position of the third walkway section defines an opening accommodating direct access to the separate conveyor.

11. The unloading apparatus of claim 10, wherein the first, second and third walkway sections are supported in a virtually horizontal plane allowing a user to walk about the first, second and third walkway sections when the third walkway section is in the first, use position.

12. The unloading apparatus of claim 10, wherein the third walkway section is movable to a substantially vertical orientation in the second, storage position whereby the opening allows the separate conveyor to project through the apparatus.

13. The unloading apparatus of claim 9, wherein the third walkway section includes a first pivoting platform section and a second pivoting platform section.

14. The unloading apparatus of claim 9, wherein the third walkway section is a single pivoting section having a pivoting end and a non-pivoting end, further including a threshold on the non-pivoting end.

15. A method of unloading items onto a separate conveyor using a movable unloading apparatus, the unloading apparatus comprising a frame supporting a ramp, the ramp movable between a first position wherein the ramp is held above the separate conveyor to allow items to be placed directly onto the separate conveyor, and a second position wherein the ramp slopes downwardly to move items down the ramp to the separate conveyor, the method comprising:
- moving the unloading apparatus adjacent to the items to be unloaded;
- moving the separate conveyor underneath at least a portion of the unloading apparatus;
- moving the ramp into the second position to allow unloading of high stacked items onto the separate conveyor using the unloading apparatus; and
- moving the ramp into the first position to allow unloading of low stacked items directly onto the separate conveyor.

* * * * *